United States Patent
Ko

(10) Patent No.: US 9,122,014 B2
(45) Date of Patent: Sep. 1, 2015

(54) OPTICAL MECHANISM OF MINIATURIZED OPTICAL SPECTROMETERS

(75) Inventor: Cheng-Hao Ko, Hsinchu County (TW)

(73) Assignee: OtO Photonics, Inc. (TW)

( * ) Notice: Subject to any disclaimer, the term of this patent is extended or adjusted under 35 U.S.C. 154(b) by 393 days.

(21) Appl. No.: 13/642,264

(22) PCT Filed: May 5, 2010
(Under 37 CFR 1.47)

(86) PCT No.: PCT/CN2010/072462
§ 371 (c)(1),
(2), (4) Date: Oct. 19, 2012

(87) PCT Pub. No.: WO2011/137584
PCT Pub. Date: Nov. 10, 2011

(65) Prior Publication Data
US 2013/0294727 A1    Nov. 7, 2013

(51) Int. Cl.
*G02B 6/34* (2006.01)
*G01J 3/28* (2006.01)
*G01J 3/02* (2006.01)
*G01J 3/18* (2006.01)

(52) U.S. Cl.
CPC ... *G02B 6/34* (2013.01); *G01J 3/02* (2013.01); *G01J 3/0256* (2013.01); *G01J 3/0291* (2013.01); *G01J 3/18* (2013.01)

(58) Field of Classification Search
None
See application file for complete search history.

(56) References Cited

U.S. PATENT DOCUMENTS

| 5,424,826 A * | 6/1995 | Kinney | 356/326 |
| 5,812,262 A * | 9/1998 | Ridyard et al. | 356/328 |
| 2006/0262303 A1* | 11/2006 | Bonne et al. | 356/328 |

FOREIGN PATENT DOCUMENTS

WO    WO 9727460 A1 *  7/1997

* cited by examiner

*Primary Examiner* — Hemang Sanghavi
(74) *Attorney, Agent, or Firm* — Han IP Corporation; Andy M. Han

(57) ABSTRACT

An optical mechanism for a miniaturized spectrometer comprises an input unit, an upper waveguide plate, a lower waveguide plate, and a miniature diffraction grating. The input unit is used to receive an optical signal and direct the optical signal to the interior of the optical mechanism. The upper waveguide plate has a first reflective surface. The lower waveguide plate having a second reflective surface aligned substantially parallel to the upper waveguide plate. The first reflective surface is located opposite to the second reflective surface. An optical channel is formed between the first reflective surface and the second reflective surface, so that optical signal from the input unit can travel in the optical channel. The miniature diffraction grating separates the optical signal transmitted in the optical channel into a plurality of spectral components and directs the spectral components to an image capture module at an end of the miniaturized spectrometer.

10 Claims, 7 Drawing Sheets

OPTICAL MECHANISM OF MINIATURIZED OPTICAL SPECTROMETERS

CROSS-REFERENCE TO RELATED APPLICATION

This application is the national phase application of International application number PCT/CN2010/072462, filed May 5, 2010, which is incorporated by reference in its entirety.

TECHNICAL FIELD

The present invention relates to an optical mechanism for miniaturized spectrometers, and more particularly relates to an optical mechanism that allows an optical signal to be transmitted in a waveguide to avoid divergence of the optical signal.

BACKGROUND

Spectrometers are a type of non-destructive testing instruments. They can be used, for example, to analyze chemical compositions and characteristics of substances. When light strikes a substance, according to the principle of light reflection and differences in the reflection, absorption or transmission of light of different frequencies due to compositions of substances, a spectrometer produces a spectrum after receiving light reflected from the substance. Given that different substances produce spectra of unique characteristics, the composition and characteristics of substances can be discerned accordingly.

FIG. 1 is a schematic diagram of a conventional spectrometer 500. Referring to FIG. 1, a beam of light enters into the spectrometer 500 and travels in free space towards a collimating lens 502. The light beam is then transformed by the collimating lens 502 into a paralleling light beam towards a grating 504. After being diffracted by the grating 504 and focused by a focusing lens 506, the light bam is directed towards a detector 508 which detects intensities of light of different wavelengths to produce a corresponding image. However, with the conventional spectrometer 500, due to numerous reflections, divergence of free space, and excessive light traveling path, significant divergence of light beams tends to result. Moreover, as it is difficult to clean conventional spectrometers to eliminate stray light therein, the existence of the stray light tends to cause excessive background noise in the corresponding image. Both of these drawbacks will affect the quality of the image produced by the detector 508, thus reducing the accuracy in the determination of intensities of light of different wavelengths by a post-stage circuit.

SUMMARY

The present invention provides an optical mechanism for miniaturized spectrometers. By forming an optical channel, more focused and less diverged light beams can be produced in the spectrometer, thereby improving the accuracy in the determination of intensities of light of different wavelengths by a post-stage circuit.

A so-called miniaturized spectrometer generally includes a miniature diffraction grating commonly made by micro-electro-mechanical system (MEMS) process, semiconductor process, lithography, electroplating and molding (Lithographie GaVanoformung Abformung, LIGA) or other manufacturing processes. The height of the miniature grating is typically in a range from approximately a few tens of microns to a few hundreds of microns. In general, the grating profile is a curved surface that can focus diffracted optical signals on an image capture module at a rear end of the spectrometer, thus eliminating the need of a focusing lens that is commonly used in conventional spectrometers. (Of course, if a plane miniature diffraction grating is utilized, then the focusing lens would be needed; otherwise the image capture module would need to be very wide in order to receive entire signals). However, as the height of a miniature diffraction grating is normally much smaller than that of conventional spectrometers, the amount of optical signals that can reach the miniature diffraction grating to be split by the miniature diffraction grating tends to be small. Therefore, it is challenging to construct a suitable optical channel to focus incident light so that the light entering into a miniaturized spectrometer can be fully utilized.

According to one aspect of the present invention, an optical mechanism for a miniaturized spectrometer comprises an input unit, an upper waveguide plate, a lower waveguide plate, and a miniature diffraction grating. The input unit is configured to receive optical signals. Moreover, the upper waveguide plate has a first reflective surface. The lower waveguide plate has a second reflective surface that is aligned substantially parallel to the upper waveguide plate. The first reflective surface and the second reflective surface face one another on opposite sides, forming an optical channel therebetween so that optical signals from the input unit can travel in the optical channel. The miniature diffraction grating separates optical signals transmitted in the optical channel into numerous spectral components and directs the resulting spectral components to an image capture module.

In order to make the content of the present invention clearer and more understandable, preferred embodiments will be described in detail below with reference to the figures.

NUMERICAL REFERENCES FOR MAJOR COMPONENTS

Figure 1:
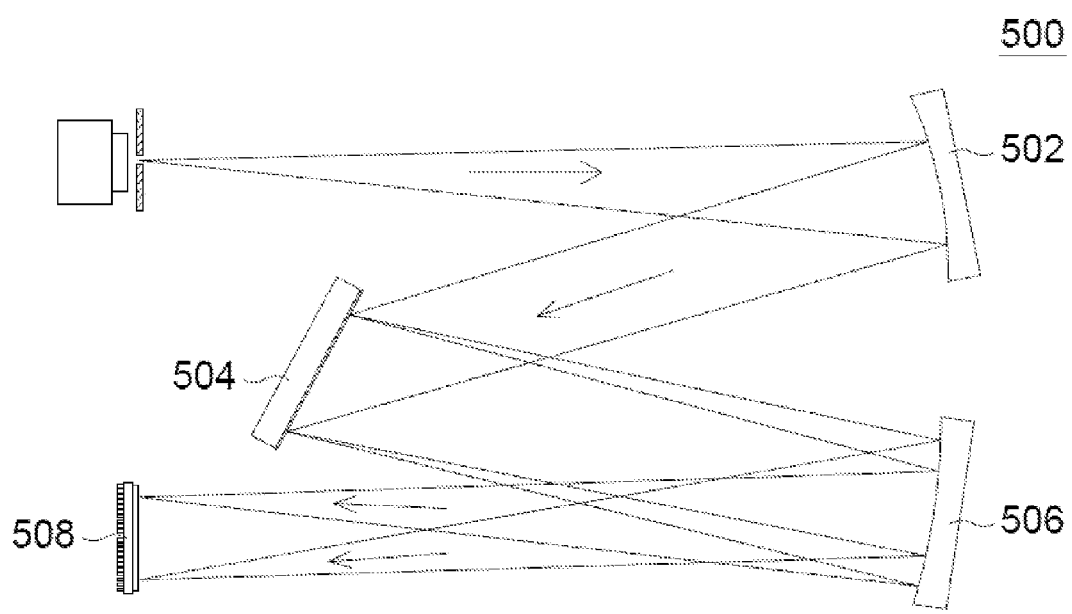
FIG. 1 is a schematic diagram of a conventional spectrometer.

50: optical signal
51: spectral components
52: deviated optical signal
100, 200: optical mechanism of a miniaturized spectrometer
110: input unit
120: upper waveguide plate
120a: highly reflective film
120b: first protective film
122: first reflective surface
130: lower waveguide plate 132: second reflective surface
134: slit plate
136: slit
140: optical channel
150: image capture module
160: miniature diffraction grating
270: first light extinction module
270a: one side of the first light extinction module
272: second light extinction module
272a: one side of the second light extinction module
500: spectrometer
502: collimating lens
504: diffraction grating
506: focusing lens
508: detector
θ: angle

DETAILED DESCRIPTION OF PREFERRED EMBODIMENTS

Detailed description of various embodiments is provided below. The embodiments are provided as example embodiments for illustration purpose and do not limit the scope of the present invention. In addition, non-critical components may be omitted in the drawings of the embodiments in order to clearly illustrate the technical characteristics of the present invention.

First Embodiment

Figure 2:
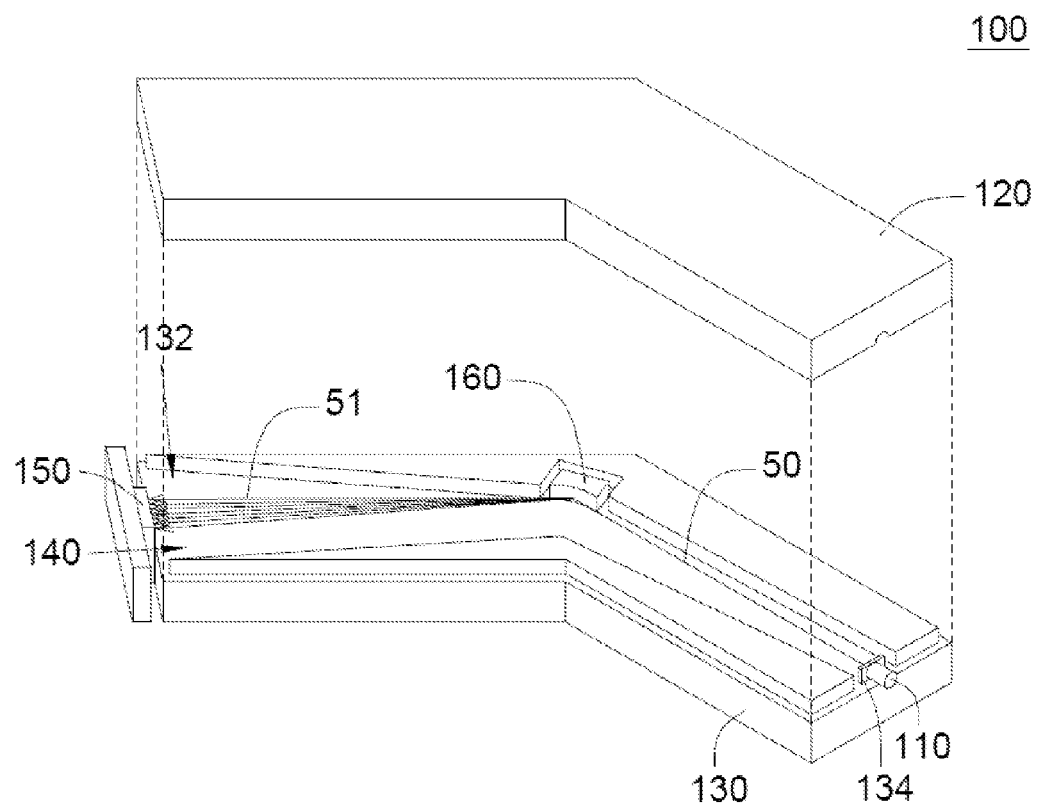
FIG. 2 is a perspective view of a disassembled optical mechanism in a miniaturized spectrometer in accordance with a first embodiment of the present invention.
Figure 3:
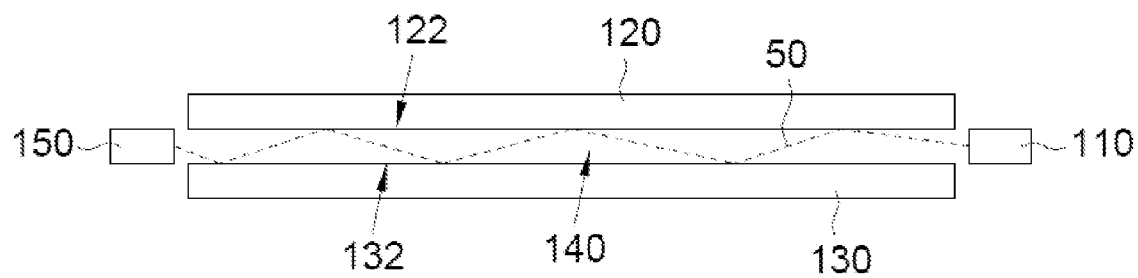
FIG. 3 is a schematic diagram of a light beam traveling in an optical channel of the optical mechanism of the miniaturized spectrometer shown in FIG. 2.

Referring to FIG. 2 and FIG. 3, FIG. 2 is a perspective view of a disassembled optical mechanism in a miniaturized spectrometer in accordance with the first embodiment of the present invention. FIG. 3 is a schematic diagram of a light beam traveling in an optical channel of the optical mechanism of the miniaturized spectrometer shown in FIG. 2. The immediate-following description of the present embodiment refers to FIG. 2 and FIG. 3. An optical mechanism 100 of a miniaturized spectrometer comprises an input unit 110, an upper waveguide plate 120, a lower waveguide plate 130, and a miniature diffraction grating 160. The optical mechanism 100 of the miniaturized spectrometer may also comprise an image capture module 150 at a rear end of the optical mechanism 100 of the miniaturized spectrometer. Various components of the present embodiment are described in more detail below.

The input unit 110 in the optical mechanism 100 of the miniaturized spectrometer is utilized to receive an optical signal 50. The upper waveguide plate 120 has a first reflective surface 122. The lower waveguide plate 130 is aligned substantially parallel to the upper waveguide plate 120 and has a second reflective surface 132. The first reflective surface 122 and the second reflective surface 132 are disposed opposite to and facing one another. An optical channel 140 is formed between the first reflective surface 122 and the second reflective surface 132, so that the optical signal 50 from the input unit 110 can be transmitted within the channel 140. As shown in FIG. 3, the optical channel 140 formed between the first reflective surface 122 and the second reflective surface 132 is a cavity-type channel. Unlike optical fibers, in which light beams are transmitted based on the principle of total reflection, the present invention confines and transmits the optical signal between the reflective surfaces with the optical signal being repeatedly reflected by the reflective surfaces. Alternatively, the cavity formed between the reflective surfaces may be filled with appropriate materials (e.g., glass, plastic, or acrylic, etc.) to allow the optical signal to be repeatedly reflected and transmitted forward, and to prevent dust, debris or other pollutants from being deposited on the upper and lower waveguide plates which would affect the flatness and reflectivity of the waveguide plates. The miniature diffraction grating 160 is utilized to separate the optical signal 50 transmitted in the optical channel 140 into a plurality of spectral components 51 and to direct these spectral components 51 to the image capture module 150, where a corresponding image can be obtained.

For the optical mechanism 100 of the miniaturized spectrometer described above, it is imperative that the upper waveguide plate 120 and the lower waveguide plate 130 have a high degree of flatness as well as reflectivity, so that minimal optical loss and optimal light source focus effect can be achieved when the optical signal 50 travels between the upper waveguide plate 120 and the lower waveguide plate 130. Therefore, the upper waveguide plate 120 and the lower waveguide plate 130 can be made from, for example, stainless steel, silicon, glass, compact disc, or hard drive disc. In addition, if the reflectivity of the material used for the upper waveguide plate 120 and the lower waveguide plate 130 does not meet a certain requirement, a highly reflective film can be coated on the first reflective surface 122 and the second reflective surface 132 to address this issue. Preferably, materials such as an aluminum film may be used as the highly reflective film.

Figure 4:
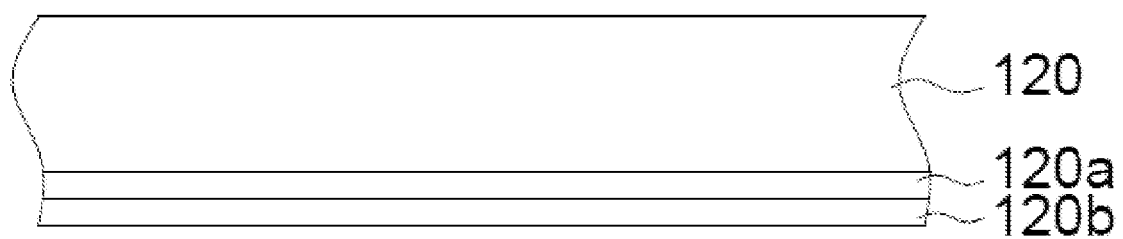
FIG. 4 is a schematic diagram of an example of an upper waveguide plate.

To prevent the first reflective surface 122 and the second reflective surface 132 become oxidized, corroded, and/or rough with the elapse of time, thus reducing the flatness and reflectivity of the reflective surfaces, a first protective film and a second protective film may be coated on the highly reflective films of the first reflective surface 122 and the second reflective surface 132, respectively. The protective films can be made of, for example, silicon dioxide. Taking the upper waveguide plate 120 as an example, the upper waveguide plate 120 may include a highly reflective film 120a and a first protective film 120b, as shown in FIG. 4. Materials mentioned in the present embodiment are examples and do not limit the spirit and scope of the present invention. Any material that is capable of achieving the same purpose and effect can be employed in the present embodiment.

Figure 5:
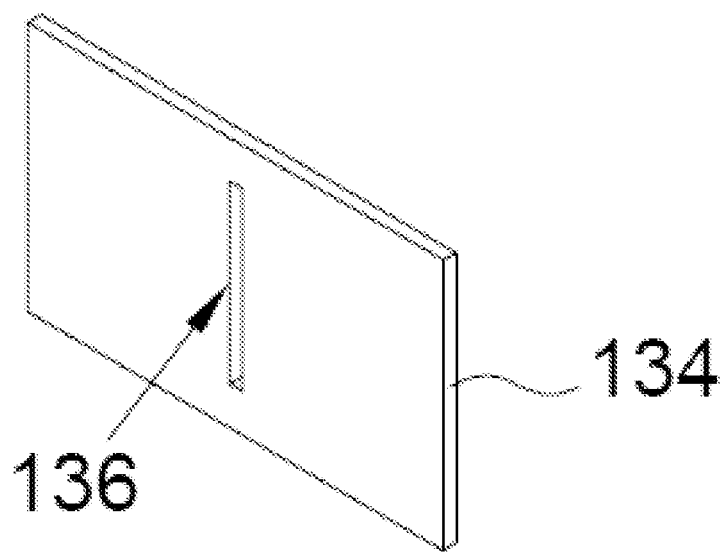
FIG. 5 is a schematic diagram of an example of a slit plate.

The aforementioned imagine capture module 150 is, for example, a charge-coupled device (CCD) or a complementary metal-oxide-semiconductor (CMOS). The input unit 110 comprises, for example, a slit plate 134 having a slit 136, as shown in FIG. 5. After the optical signal 50 passes through the slit 136, it is directed to the miniature diffraction grating 160 via the optical channel 140.

The width of the slit 136, for example, is approximately 25 microns (μm), and the height of the slit, for example, is approximately 150 microns (μm), while the spacing between the first reflective surface 122 and the second reflective surface 132, for example, is in a range between approximately 100 and 150 microns (μm). The height difference between the local maximum point and the local minimum point on the first reflective surface 122 or the second reflective surface 132 is, for example, in a range between approximately one-tenth of a wavelength and three-tenth of a wavelength in order to meet the requirement of high flatness. Assuming the reflectivity of each of the first reflective surface 122 and the second reflective surface 132 is 90%, for example, a distance for the optical signal 50 traveling from the slit plate 134 to the miniature diffraction grating 160, for example, is 28 millimeters (mm), and a distance from the miniature diffraction grating 160 to the image capture module 150 is approximately 40 millimeters (mm).

Comparing the optical mechanism 100 of the miniaturized spectrometer of the present embodiment with the conventional spectrometer 500 shown in FIG. 1, optical signals traveling within the cavity of the conventional spectrometer 500 may become weak due to divergence and thus be subject to the problem of severe interference by stray light. In addition, spectrometer 500 also has relatively large size. In the present embodiment, since the optical signal 50 can travel within the optical channel 140, light beams in the spectrometer are more focused, and not easily diverged. As a result, the efficiency of the optical mechanism 100 of the miniaturized spectrometer can be effectively improved. Moreover, as a stray light extinction mechanism may be added to the optical mechanism 100 of the miniaturized spectrometer of the present embodiment (described in detail below), more precise images can be obtained by the image capture module 150 due to less interference by stray light. When images are transferred to a post-stage circuit, the accuracy in determining the physical or biochemical meaning of the optical signal based on intensities of light of different wavelengths can be further improved.

Second Embodiment

Figure 6:
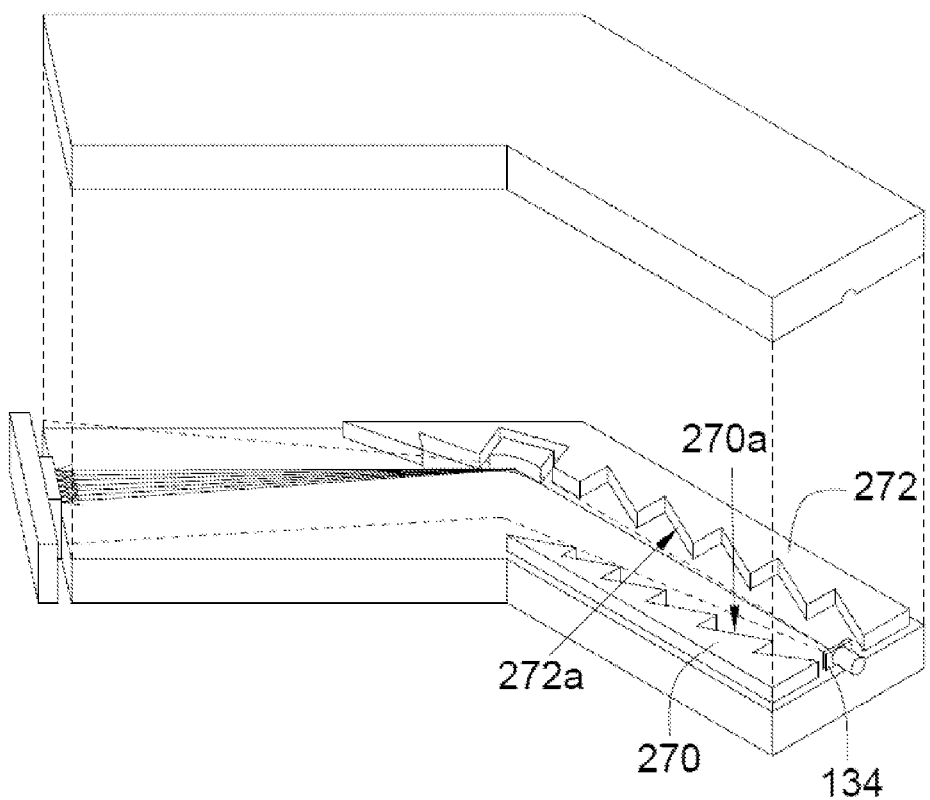
FIG. 6 is a perspective view of a disassembled optical mechanism in a miniaturized spectrometer in accordance with a second embodiment of the present invention.
Figure 7:
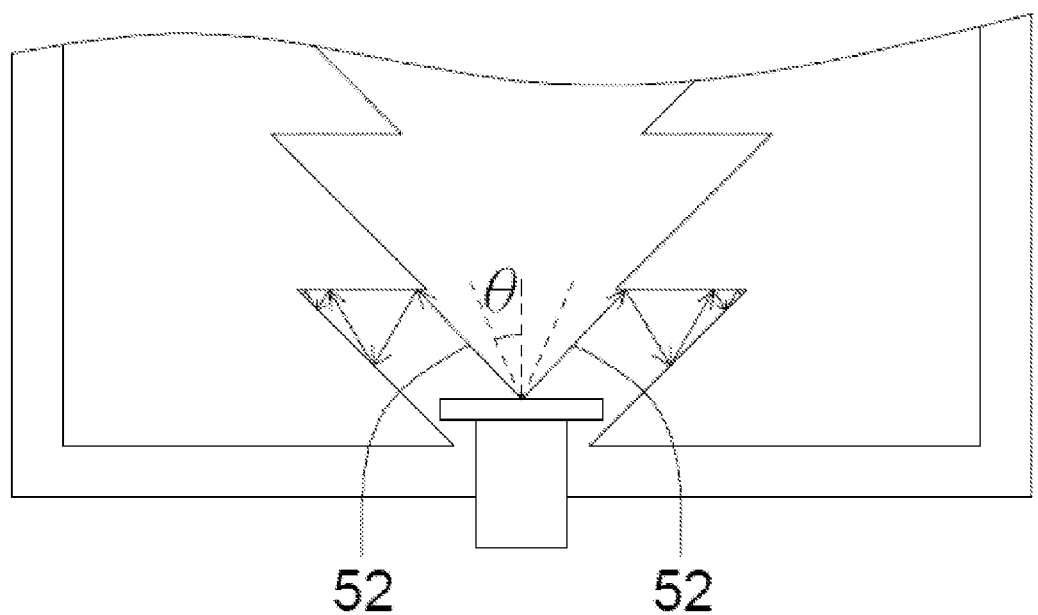
FIG. 7 is a schematic diagram showing a light extinction mechanism of a light extinction module shown in FIG. 6.

Referring to FIG. 6 and FIG. 7, FIG. 6 is a perspective view of a disassembled optical mechanism in a miniaturized spectrometer in accordance with the second embodiment of the present invention. FIG. 7 is a schematic diagram of a light extinction mechanism of a light extinction module shown in FIG. 6. The following description refers to FIG. 6 and FIG. 7. The difference between the present embodiment and the first embodiment is that, the optical mechanism 200 of the miniaturized spectrometer further comprises a first light extinction module 270 and a second light extinction module 272. The cross-section of each of the first light extinction module 270 and the second light extinction module 272 has a serrated side facing the optical channel 140. For example, the side 270a of the first light extinction module 270 and the side 272a of the second light extinction module 272 face the optical channel 140. The first light extinction module 270 and the second extinction light module 272 are arranged on opposite sides of the optical channel 140 to absorb optical signals that are emitted from the input unit 110 with incident angles greater than a predefined angle. For example, this predefined angle, $\theta$, is related to the serrations of the first light extinction module 270 and the second light extinction module 272. Assuming the incident angles of the deviated optical signal 52 are greater than $\theta$ and when the incident angles of the deviated optical signal 52 are greater than $\theta$, the deviated optical signal 52 may be incident on the triangle notch of one of the serrations. As shown in FIG. 7, the deviated optical signal 52 is reflected back and forth between the notches of the serrations, and eventually the intensity of the deviated optical signal 52 will be decreased. As a result, the deviated optical signal 52 that might otherwise result in stray light will be extinguished by the serrated structure, thus providing more distinct spectral components. The other parts of the present embodiment are the same as those of the first embodiment, and descriptions thereof are not repeated in the interest of brevity.

The optical mechanism of miniaturized spectrometers disclosed in aforementioned embodiments of the present invention confines the transmission of optical signals entering from the input unit to the optical channel formed between the upper and the lower waveguide plates, and thus the optical signals are more focused and not easily diverged. Furthermore, the addition of the light extinction module with serrations would extinguish those optical signals having larger incident angles, thus minimizing the amount of stray light that reaches the image capture module. As a result, the desired spectral components are not interfered by stray light, and images with greater clarity can be obtained.

In summary, although specific embodiments of the present invention have been described herein for purpose of illustration, by no means they are to be interpreted as limiting the scope of the present invention. Various modifications may be made without departing from the spirit and scope of the present invention. Accordingly, the present invention is not limited except as by the appended claims.

What is claimed is:

1. An optical mechanism of a miniaturized spectrometer, comprising:
    an input unit that receives an optical signal and directs the optical signal to an interior of the optical mechanism;
    a first waveguide plate having a first reflective surface;
    a second waveguide plate substantially parallel to the first waveguide plate, the second waveguide plate having a second reflective surface opposite the first reflective surface, the first reflective surface and the second reflective surface forming an optical channel for transmitting the optical signal;
    a miniature diffraction grating that separates the optical signal into a plurality of spectral components received by an image capture module located at an end of the miniaturized spectrometer; and
    a first light extinction module and a second light extinction module that are arranged on opposite sides of the optical channel, a respective cross-section of each of the first light extinction module and the second light extinction module has a serrated side facing the optical channel and configured to absorb optical signals with incident angles greater than a predefined angle.

2. The optical mechanism of the miniaturized spectrometer of claim 1, further comprising:
    a first reflective film disposed on the first reflective surface; and
    a second reflective film disposed on the second reflective surface.

3. The optical mechanism of the miniaturized spectrometer of claim 2, wherein at least one of the first or the second reflective films comprises an aluminum film.

4. The optical mechanism of the miniaturized spectrometer of claim 2, further comprising:
    a first protective film disposed on the first reflective film on the first reflective surface; and
    a second protective film disposed on the second reflective film on the second reflective surface.

5. The optical mechanism of the miniaturized spectrometer of claim 4, wherein a material of the first protective film and the second protective film comprises silicon dioxide.

6. The optical mechanism of the miniaturized spectrometer of claim 1, wherein a material of the first waveguide plate and the second waveguide plate comprises stainless steel, silicon, glass, compact disc, or hard drive disc.

7. The optical mechanism of the miniaturized spectrometer of claim 1, wherein the image capture module comprises a charge-coupled device (CCD) or a complementary metal-oxide-semiconductor (CMOS).

8. The optical mechanism of the miniaturized spectrometer of claim 1, wherein the input unit comprises a slit through which the optical signal is emitted such that the optical signal is directed to the miniature diffraction grating via the optical channel.

9. The optical mechanism of the miniaturized spectrometer of claim 1, wherein the optical channel is a cavity-type channel.

10. The optical mechanism of the miniaturized spectrometer of claim 1, wherein the optical channel is filled with glass, plastic, or acrylic.

\* \* \* \* \*